(12) United States Patent
El Haddad et al.

(10) Patent No.: US 10,940,341 B2
(45) Date of Patent: Mar. 9, 2021

(54) INTERFACE BETWEEN FIRE SUPPRESSANT CONDUIT AND CARGO COMPARTMENT OF AN AIRCRAFT

(71) Applicant: BOMBARDIER INC., Dorval (CA)

(72) Inventors: Anthony El Haddad, Saint-Laurent (CA); Philippe Desy, Prevost (CA); Jean-Guy Gaudreau, St-Bernadin (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 555 days.

(21) Appl. No.: 14/771,924

(22) PCT Filed: Feb. 24, 2014

(86) PCT No.: PCT/IB2014/000197
§ 371 (c)(1),
(2) Date: Sep. 1, 2015

(87) PCT Pub. No.: WO2014/135939
PCT Pub. Date: Sep. 12, 2014

(65) Prior Publication Data
US 2016/0008641 A1 Jan. 14, 2016

Related U.S. Application Data

(60) Provisional application No. 61/773,326, filed on Mar. 6, 2013.

(51) Int. Cl.
*A62C 3/08* (2006.01)
*A62C 35/68* (2006.01)
*B64D 45/00* (2006.01)

(52) U.S. Cl.
CPC .............. *A62C 3/08* (2013.01); *A62C 35/68* (2013.01); *B64D 45/00* (2013.01); *B64D 2045/009* (2013.01)

(58) Field of Classification Search
CPC .......... A62C 3/08; A62C 35/68; B64D 45/00; B64D 2045/009
(Continued)

(56) References Cited

U.S. PATENT DOCUMENTS 4,047,572 A * 9/1977 Stary ................. A62C 3/00
169/62
5,469,147 A 11/1995 Trey et al.
(Continued)

FOREIGN PATENT DOCUMENTS

CA 2575915 A1 7/2008
CN 2456751 Y 10/2001
(Continued)

OTHER PUBLICATIONS

The State Intellectual Property Office of the People's Republic of China; Second Office Action dated Sep. 4, 2017, re: China patent application No. 201480012438.
(Continued)

*Primary Examiner* — Christopher S Kim
(74) *Attorney, Agent, or Firm* — Norton Rose Fulbright Canada LLP

(57) ABSTRACT

Apparatus and methods related to fire suppression in cargo compartments of aircraft are disclosed. An exemplary apparatus provides an interface (38) between a fire suppressant conduit (18) and a cargo panel (28) of a cargo compartment (12) of an aircraft (10). The apparatus comprises an adaptor (40) configured to provide the fire suppressant conduit (18) access to the cargo compartment (12) through the cargo panel (28) and a sealing member (42) configured to provide a seal between the adaptor (40) and the fire suppressant conduit (18). The adaptor (40) comprises an aperture (56) for receiving the fire suppressant conduit (18) where the aperture (56) is sized to permit passage of a nozzle (36) of
(Continued)

the fire suppressant conduit (18) therethrough. Associated methods (600, 700) for removing the cargo panel (28) of the cargo compartment (12) of the aircraft (10) without disassembly of the nozzle (36) of the fire suppressant conduit (18) are also disclosed.

9 Claims, 7 Drawing Sheets

(58) Field of Classification Search
USPC .................................................. 169/53, 62
See application file for complete search history.

(56) References Cited

U.S. PATENT DOCUMENTS

| | | | |
|---|---|---|---|
| 5,511,622 A * | 4/1996 | Thompson | A62C 99/00 169/62 |
| 5,625,346 A | 4/1997 | Shim et al. | |
| 5,764,149 A | 6/1998 | Patel et al. | |
| 5,826,664 A | 10/1998 | Richardson | |
| 6,003,608 A | 12/1999 | Cunningham | |
| 6,181,426 B1 | 1/2001 | Bender et al. | |
| 6,279,272 B1 | 8/2001 | Nill, Jr. | |
| 6,377,183 B1 | 4/2002 | Baker et al. | |
| 6,397,595 B2 | 6/2002 | Benoit et al. | |
| 6,601,653 B2 | 8/2003 | Grabow et al. | |
| 6,619,404 B2 | 9/2003 | Grabow | |
| 6,676,081 B2 | 1/2004 | Grabow et al. | |
| 6,820,559 B1 | 11/2004 | Comtesse | |
| 6,860,333 B2 | 3/2005 | Laib et al. | |
| 6,881,948 B2 | 4/2005 | Dammann | |
| 6,883,326 B2 | 4/2005 | Winkler | |
| 6,929,073 B2 * | 8/2005 | Thompson | A62C 3/04 169/70 |
| 6,935,433 B2 | 8/2005 | Gupta | |
| 6,948,566 B2 | 9/2005 | Sundholm | |
| 6,960,019 B2 | 11/2005 | Dammann | |
| 6,975,237 B2 | 12/2005 | Barton et al. | |
| 7,015,820 B2 | 3/2006 | Bobenhausen | |
| 7,066,274 B2 | 6/2006 | Lazzarini | |
| 7,118,272 B2 | 10/2006 | Bobenhausen | |
| 7,154,388 B2 | 12/2006 | Mazzone | |
| 7,161,499 B2 | 1/2007 | Vaysse et al. | |
| 7,195,180 B2 | 3/2007 | Lee | |
| 7,286,333 B2 | 10/2007 | Kubinski et al. | |
| 7,314,597 B2 | 1/2008 | Haupt et al. | |
| 7,331,401 B2 | 2/2008 | Bobenhausen | |
| 7,434,628 B2 | 10/2008 | Scheidt | |
| 7,506,478 B2 | 3/2009 | Bobenhausen | |
| 7,510,022 B2 | 3/2009 | Lazzarini | |
| 7,529,472 B2 | 5/2009 | Lazzarini et al. | |
| 7,557,721 B2 | 7/2009 | Chaniot | |
| 7,688,199 B2 | 3/2010 | Zhang et al. | |
| 7,724,151 B2 | 5/2010 | Taberski et al. | |
| 7,735,571 B2 | 6/2010 | Fabre | |
| 7,746,238 B2 | 6/2010 | Behle et al. | |
| 2010/0176258 A1 | 7/2010 | Oh | |
| 2012/0103638 A1 | 5/2012 | Mickelsen et al. | |
| 2012/0255746 A1 | 10/2012 | Johnsen et al. | |

FOREIGN PATENT DOCUMENTS

| | | | |
|---|---|---|---|
| CN | 1555280 A | 12/2004 | |
| CN | 101291706 A | 10/2008 | |
| CN | 201646867 U | 11/2010 | |
| CN | 202195171 U | 4/2012 | |
| CN | 202338990 U | 7/2012 | |
| CN | 202484007 U | 10/2012 | |
| DE | 102010047073 B3 | 1/2012 | |
| EP | 0344025 B1 | 1/1993 | |
| EP | 0435711 B1 | 5/1994 | |
| EP | 0560030 B1 | 12/1996 | |
| EP | 0559520 B1 | 5/1997 | |
| EP | 0815902 B1 | 8/2001 | |
| EP | 0949479 B1 | 9/2002 | |
| EP | 1160461 B1 | 7/2004 | |
| EP | 1319920 B1 | 6/2005 | |
| EP | 1470840 B1 | 2/2006 | |
| EP | 1470838 B1 | 4/2006 | |
| EP | 1470839 B1 | 4/2006 | |
| EP | 1355120 B1 | 6/2006 | |
| EP | 1437701 B1 | 6/2006 | |
| EP | 1361411 B1 | 7/2006 | |
| EP | 1585933 B1 | 7/2006 | |
| EP | 1199087 B1 | 8/2006 | |
| EP | 1475761 B1 | 11/2006 | |
| EP | 1552859 B1 | 12/2007 | |
| EP | 1528521 B1 | 9/2009 | |
| WO | 2006/058330 A2 | 6/2006 | |

OTHER PUBLICATIONS

English translation of DE patent document No. DE102010047073 dated Jan. 12, 2012; https://www.google.ca/patents/DE102010047073B3?cl=en&dq=DE102010047073B3, accessed on Oct. 3, 2017.

English translation of China patent document No. CN 202338990U dated Jul. 18, 2012; https://encrypted.google.com/patents/CN202338990U?cl=en, accessed on Oct. 3, 2017.

English translation of China patent document No. CN 202195171U dated Apr. 18, 2012; https://www32.orbit.com/?locale=en&ticket=7fae328b-0c1f-407d-9f15-ff78a656a6e5&embedded=false#PatentDocumentPage, accessed on Oct. 4, 2017.

English translation of China patent document No. CN 202484007U dated Oct. 10, 2012, https://encrypted.google.com/patents/CN202484007U?cl=en, accessed on Oct. 3, 2017.

PCT International Search Report and Written Opinion dated Nov. 10, 2014 re: International Application No. PCT/IB2014/000197.

Google Translation of Patent No. DE 10 2010 047 073 B3 dated Jan. 12, 2012.

The State Intellectual Property Office of the People's Republic of China; Office Action dated Jan. 20, 2017 re: China patent application No. 201480012438.

English translation of China patent document No. CN 2456751Y dated Oct. 31, 2001; www.google.ca/patents/ . . . .

English translation of China patent document No. CN 201646867U dated Nov. 24, 2010; https://encrypted.google.com/patents/ . . . .

English translation of China patent document No. CN 1555280A dated Dec. 15, 2004; www.google.com/patents/ . . . .

Canadian Intellectual Property Office, Requisition by the Examiner re: application No. 2,901,900, dated Jan. 28, 2020.

The State Intellectual Property Office of Peoples Republic of China, First Office Action, regarding Chinese patent application No. 201810311209.8, dated Mar. 16, 2020.

English translation of Chinese Patent Document No. 101291706 dated Oct. 22, 2008, https://patents.google.com/patent/CN101291706A/en?oq=CN101291706, accessed on Oct. 19, 2020.

Canadian Intellectual Property Office, Examiner's Requisition re. Canadian Patent Application No. 2,901,900, Aug. 18, 2020.

Norton Rose Fulbright, Response to Examiner's Requisition of Jan. 28, 2020 re. Canadian Patent Application No. 2,901,900, May 27, 2020.

* cited by examiner

INTERFACE BETWEEN FIRE SUPPRESSANT CONDUIT AND CARGO COMPARTMENT OF AN AIRCRAFT

CROSS REFERENCE TO RELATED APPLICATIONS AND CLAIM OF PRIORITY

This application is a national phase application under 35 U.S.C. 371 of International Patent Application No. PCT/IB2014/000197 filed on Feb. 24, 2014, which claims priority from U.S. provisional patent application No. 61/773,326 filed on Mar. 6, 2013, the entire contents of which are hereby incorporated by reference.

TECHNICAL FIELD

The disclosure relates generally to fire suppression in cargo compartments of aircraft, and more particularly to interfaces between fire suppressant conduits and cargo compartments of aircraft.

BACKGROUND OF THE ART

Commercial aircraft with cargo compartments typically have fire detection and fire suppression systems as safety features for use in the event of fire in cargo compartments. Fire-suppression systems can disperse a fire suppression agent in the cargo compartments. The fire suppression agent is delivered to the cargo compartment from reservoirs stored outside of the cargo compartments via conduits that access the cargo compartments through the walls and/or ceilings of the cargo compartments. Existing interfaces between the conduits of fire suppression systems and the walls/ceilings of cargo compartments can cause some maintenance tasks to be relatively complicated and time consuming.

Improvement is therefore desirable.

SUMMARY

The disclosure describes systems, apparatus, devices and methods related to fire suppression in cargo compartments of aircraft. For example, the systems, apparatus, devices and methods disclosed herein relate to interfaces between fire suppressant conduits and cargo compartments of aircraft.

Thus, in one aspect, the disclosure describes an apparatus for delivering a fire suppressant to a cargo compartment of an aircraft. The apparatus comprises:

a fire suppressant conduit accessing the cargo compartment through a cargo panel; and a flexible interface between the fire suppressant conduit and the cargo panel, the flexible interface being configured to absorb at least some relative movement between the cargo panel and the fire suppressant conduit.

The fire suppressant conduit may be rigidly secured to aircraft structure.

The flexible interface may comprise a compressible sealing member.

The flexible interface may comprise: an adaptor comprising an aperture for receiving the fire suppressant conduit, the aperture being sized to permit passage of a nozzle of the fire suppressant conduit therethrough; and a sealing member configured to provide a seal between the adaptor and the fire suppressant conduit.

The sealing member may be rigidly secured to aircraft structure and flexibly biased against the adaptor.

The sealing member may be flexibly biased against a portion of the adaptor surrounding the aperture.

The fire suppressant conduit may comprise a delivery tube extending between the nozzle and a main line, the delivery tube extending substantially perpendicular to the cargo panel and to the main line.

In another aspect, the disclosure describes an apparatus for providing an interface between a fire suppressant conduit and a cargo panel of a cargo compartment of an aircraft. The apparatus comprises:

an adaptor configured to provide the fire suppressant conduit access to the cargo compartment through the cargo panel, the adaptor comprising an aperture for receiving the fire suppressant conduit, the aperture being sized to permit passage of a nozzle of the fire suppressant conduit therethrough; and a sealing member configured to provide a seal between the adaptor and the fire suppressant conduit.

In at least one embodiment, at least a portion of the sealing member is compressible.

The sealing member may be configured to be flexibly biased against the adaptor.

The sealing member may be configured to provide the seal between the fire suppressant conduit and a portion of the adaptor surrounding the aperture.

In at least one embodiment, at least a portion of the sealing member is annular and is configured to receive the fire suppressant conduit therethrough.

In at least one embodiment at least a portion of the sealing member is compressible along a central axis of the sealing member.

The annular portion of the sealing member may be configured to be biased against the adaptor and form an annular sealing interface surrounding the aperture of the adaptor.

The sealing member may be configured to substantially prevent hazardous quantities of smoke, flames, and fire suppressant from leaving the cargo compartment.

In at least one embodiment, the adaptor may be configured to be secured to the cargo panel and extend across an aperture in the cargo panel; the adaptor may comprise a back side opposite the cargo compartment during use; and the sealing member may be configured to form the seal with the back side of the adaptor.

The sealing member may be configured to be biased against the back side of the adaptor and provide an annular sealing interface surrounding the aperture of the adaptor.

The sealing member may be secured to aircraft structure.

The sealing member may be secured to a bracket to which the fire suppressant conduit is also secured.

The sealing member may comprise a plate and a compressible member.

The fire suppressant conduit may extend through the plate via an aperture in the plate.

The plate of the sealing member may be secured to aircraft structure.

In another aspect, the disclosure describes an apparatus for providing an interface between a cargo compartment of an aircraft and a fire suppressant conduit. The apparatus comprises:

a cargo panel unit defining at least a portion of the cargo compartment, the cargo panel unit comprising an aperture for providing a fire suppressant conduit access to the cargo compartment, the aperture being sized to permit passing of a nozzle of the fire suppressant conduit therethrough; and a sealing member configured to provide a seal between the cargo panel unit and the fire suppressant conduit.

The cargo panel unit may comprise a cargo panel and an adaptor attached to the cargo panel, and, the aperture may extend through the cargo panel and the adaptor.

In at least one embodiment, at least a portion of the sealing member is resilient.

The sealing member may be configured to be flexibly biased against a side of the cargo panel unit opposite the cargo compartment.

The sealing member may be configured to provide an annular sealing interface surrounding the aperture of the cargo panel unit.

In at least one embodiment, at least a portion of the sealing member is annular and is configured to receive the fire suppressant conduit therethrough.

In another aspect, the disclosure describes an adaptor configured to provide a fire suppressant conduit access to a cargo compartment of an aircraft through a cargo panel. The adaptor comprises:

a body having at least a portion configured for securing to the cargo panel; and an aperture defined in the body for receiving the fire suppressant conduit, the aperture being sized to permit passage of a nozzle of the fire suppressant conduit therethrough.

In another aspect, the disclosure describes a method for removing a cargo panel of a cargo compartment of an aircraft where a fire suppressant conduit accesses the cargo compartment through the cargo panel via an aperture sized to permit passage of a nozzle of the fire suppressant conduit therethrough. The method comprises:

releasing the cargo panel from aircraft structure; and removing the cargo panel without disassembly of the nozzle of the fire suppressant conduit.

The method may comprise: releasing an adaptor, through which the aperture is formed, from the cargo panel prior to releasing the cargo panel from the aircraft structure; and removing the adaptor while allowing the nozzle of the fire suppressant conduit to pass through the aperture of the adaptor.

Removing the cargo panel may comprise moving the adaptor away from the cargo panel and decompressing a sealing member flexibly biased against the adaptor.

In a further aspect, the disclosure describes an aircraft comprising the systems, apparatus, devices as defined herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
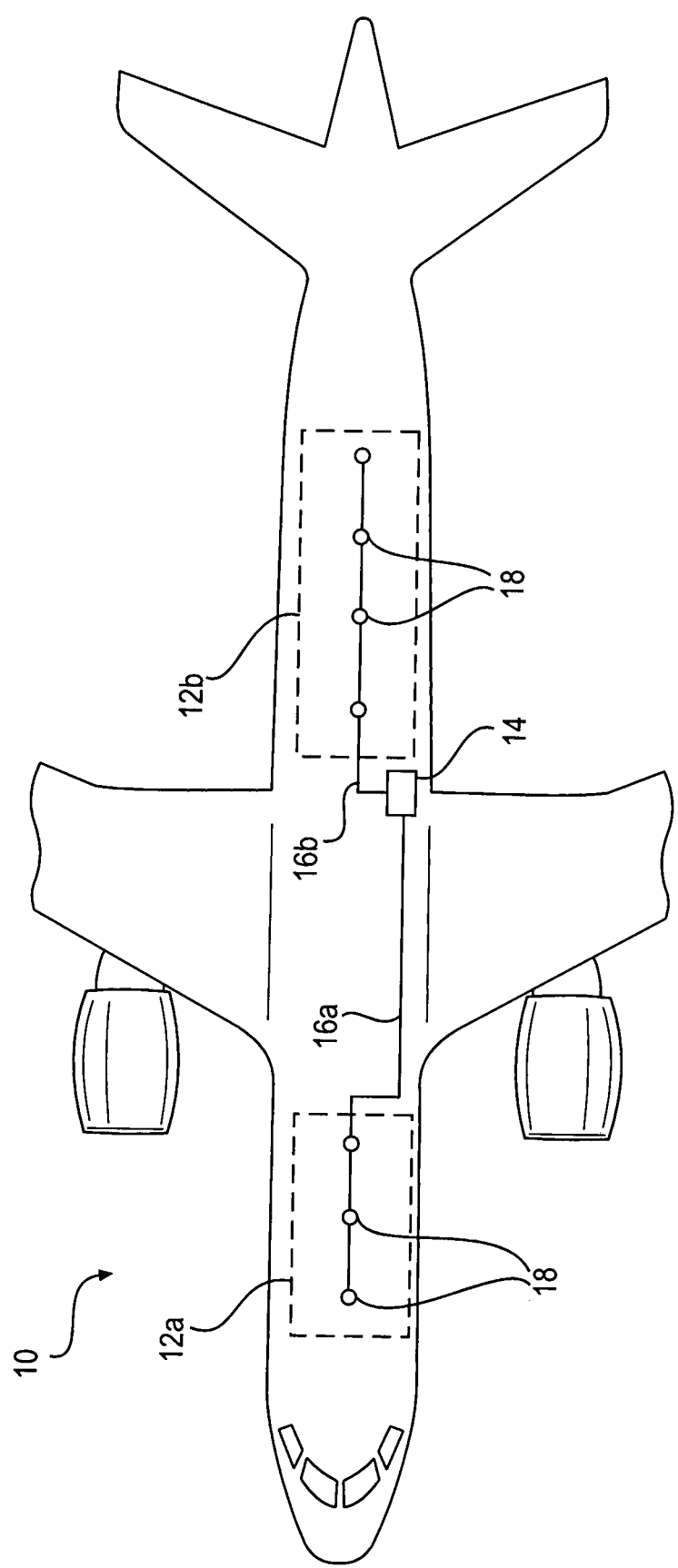
FIG. 1 shows a partial schematic top plan view of an aircraft comprising a fire suppression system according to the present disclosure.

FIG. 1 illustrates a partial schematic top plan view of aircraft 10 comprising a fire suppression system for one or more cargo compartments 12 (i.e., 12a, 12b). Aircraft 10 may include, for example, any suitable aircraft such as corporate, private, commercial or any other type of aircraft that may comprise one or more cargo compartments 12. For example, aircraft 10 may be a narrow-body, twin engine jet airliner. Cargo compartments 12 may comprise one or more forward cargo compartments 12a and/or one or more aft cargo compartments 12b. Cargo compartments 12 may be disposed below a passenger cabin (shown in FIG. 3 as element 26) of aircraft 10. Aircraft 10 may also comprise fire and/or smoke detection system(s) (not shown) that may be used in conjunction with the fire suppression system of aircraft 10.

The fire suppression system of aircraft 10 may comprise one or more containers 14 (e.g., bottles) of fire suppressant (i.e., fire suppression agent). While container 14 is referenced hereinbelow and shown in FIG. 1 as being singular, it is understood that container 14 may also comprise a plurality of such containers. Container 14 may contain one or more conventional or other type(s) of fire suppressant(s) suitable for use in cargo compartments 12a, 12b of aircraft 10. For example, the fire suppressant may be a gaseous substance that is discharged into at least one of cargo compartments 12 to suppress or extinguish a fire. For example, fire suppressant may comprise a Halon suppression agent (e.g., Halon 1301) and/or an equivalent thereof.

The fire suppression system may comprise one or more main lines 16 connected to containers 14. For example, main line 16a may carry fire suppressant from container 14 to forward cargo compartment 12a and main line 16b may carry fire suppressant from container 14 to aft cargo compartment 12b. One or more fire suppressant distribution conduits 18 (hereinafter "fire suppressant conduits" 18) may be connected to main line(s) 16 for discharging the fire suppressant in the target cargo compartment 12. For example, fire suppressant conduits 18 may branch off from main line 16 to discharge fire suppressant at desired locations into the target cargo compartment 12. Fire suppressant conduits 18 may be spaced-apart (e.g., distributed) to provide a relatively uniform discharge of fire suppressant into the target cargo compartment 12. More details on fire suppressant conduits 18 are presented below in relation to FIGS. 2 and 3. It is understood that conventional or other types of control devices such as valves or other flow control devices not shown or described herein may be included in the fire suppression system.

Figure 2:
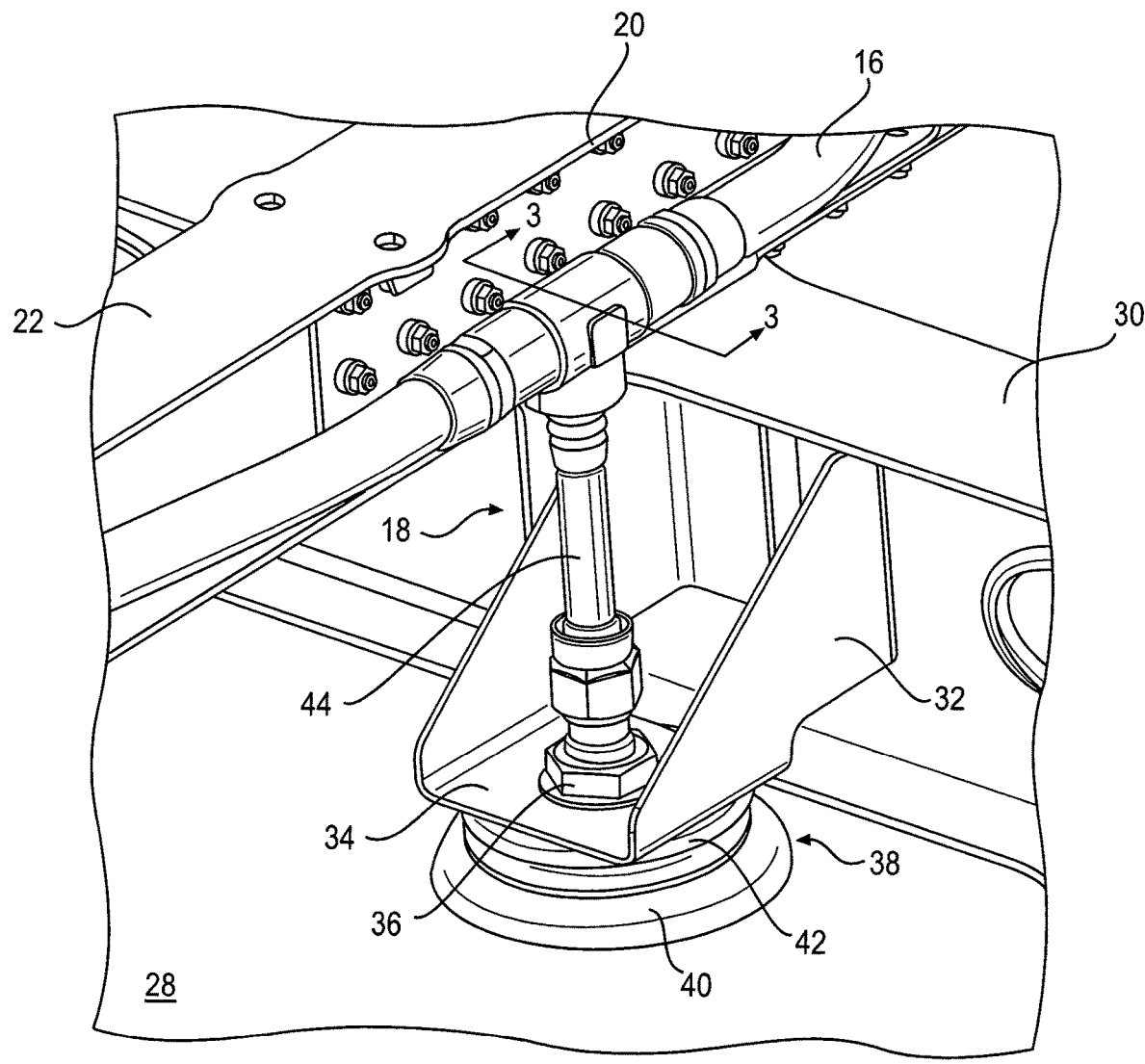
FIG. 2 shows an axonometric view of a fire suppressant distribution conduit of the fire suppression system of FIG. 1 extending in a cargo compartment.
Figure 3:
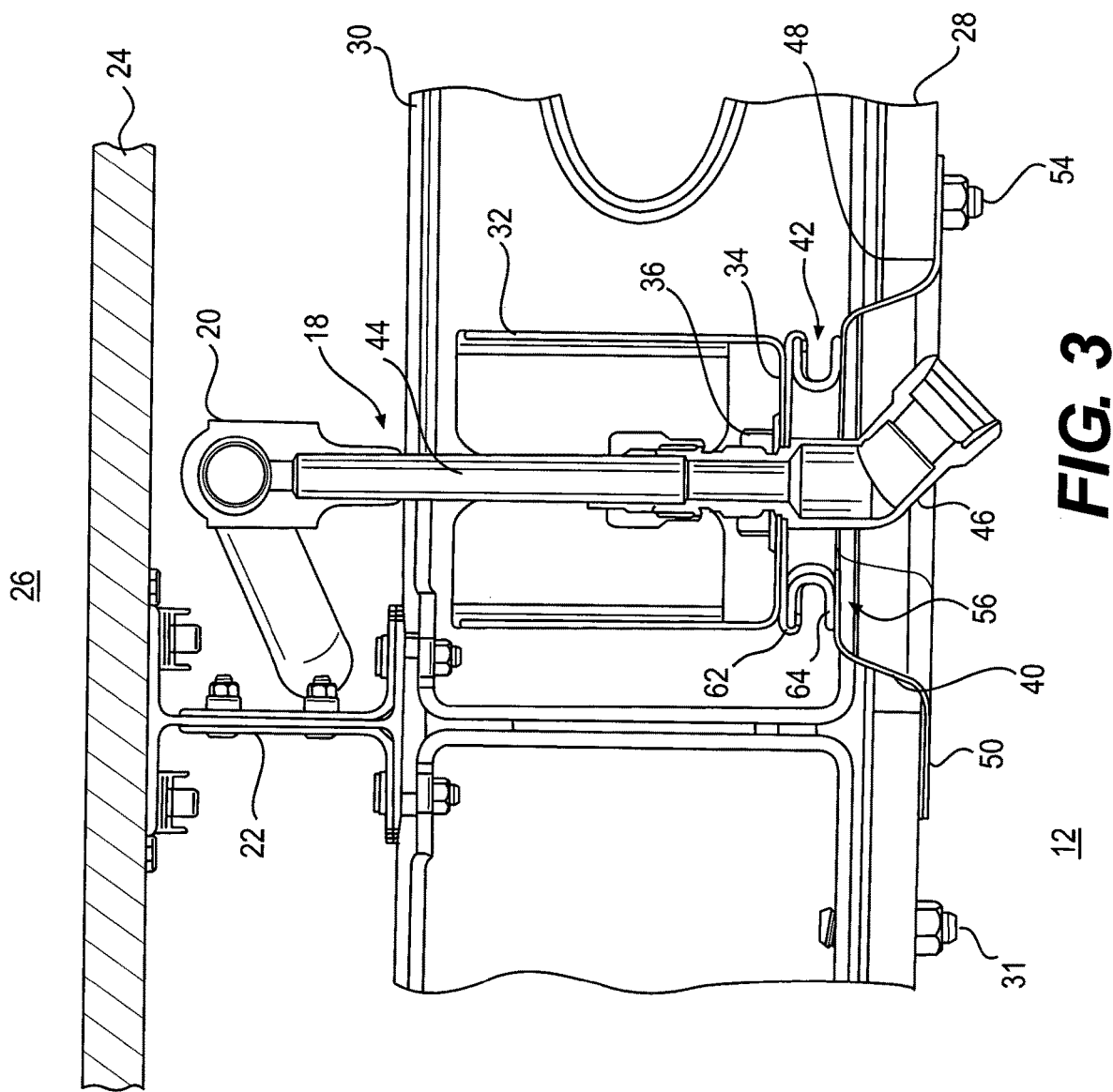
FIG. 3 shows an axial cross-sectional view of the fire suppressant distribution conduit of FIG. 2 extending in the cargo compartment, taken along line 3-3 in FIG. 2.

FIG. 2 shows an axonometric view of fire suppressant conduit 18 of the fire suppression system shown in of FIG. 1 extending into a target cargo compartment 12. One or more of fire suppressant conduits 18 shown in FIG. 1 may have a configuration as shown in FIGS. 2 and 3 and as described below. As noted above, fire suppressant conduit 18 may branch off from main line 16 via tee connector 20. Alternatively, if there is only one discharge location from main line 16, then main line 16 could be considered to be fire suppressant conduit 18 or may lead to a single fire suppressant conduit 18. Main line 16 may be secured to and supported by one or more floor beams 22 (i.e., aircraft structure). Floor beam 22 may support a floor 24 of passenger cabin 26 (shown in FIG. 3) of aircraft 10.

Fire suppressant conduit 18 may extend from main line 16 and through a cargo panel unit for discharging fire suppressant into cargo compartment 12. The cargo panel unit may comprise cargo panel 28 and, optionally, an adaptor described further below. Cargo panel 28 may define at least a portion of cargo compartment. For example, cargo panel 28 may define a ceiling portion and/or a wall portion of cargo compartment 12. Cargo panel 28 may be removably secured to cross beam 30 (i.e., aircraft structure). For example, cargo panel 28 may be secured to cross beam 30 using one or more threaded fasteners 31. Fire suppressant conduit 18 may extend substantially vertically from main line 16 to cargo compartment 12. Fire suppressant conduit 18 may be secured to cross beam 30 via bracket 32. Bracket 32 may be removably or permanently secured to cross beam 30 via suitable fastening mechanism(s) (not shown). Bracket 32 may comprise mounting platform 34 to which fire suppressant conduit 18 may be secured and through which fire suppressant conduit 18 may extend. Fire suppressant conduit 18 may be removably secured to mounting platform 34 via nut 36.

Fire suppressant conduit 18 may extend through cargo panel 28 via interface 38. Interface 38 may be relatively flexible and may at least partially mechanically decouple fire suppressant conduit 18 from cargo panel 28. For example, interface 38 may substantially absorb at least some relative movement between cargo panel 28 and fire suppressant conduit 18. Interface 38 may at least partially isolate fire suppressant conduit 18 from vibrations of cargo panel 28. Accordingly, relative movement between cargo panel 28 and fire suppressant conduit 18 may not induce potentially damaging force(s) on fire suppressant conduit 18 during normal operation of aircraft 10. For example, interface 38 may comprise adaptor 40 and sealing member 42. Adaptor 40 may provide fire suppressant conduit 18 access to cargo compartment 12. Sealing member 42 may be relatively flexible. For example, at least a portion of sealing member 42 may be compressible as explained further below. Accordingly, sealing member 42 may be resiliently compressed between mounting platform 34 of bracket 32 and adaptor 40 to form a seal during use.

The cargo panel unit may comprise cargo panel 28 and be configured to provide fire suppression conduit 18 access to cargo compartment with or without the use of adaptor 40. For example, adaptor 40 may be removably secured to cargo panel 28 or, alternatively, adaptor 40 or an equivalent thereof may be integrally formed with cargo panel 28.

Interface 38 and the sealing capability of sealing member 42 may, in some embodiments, be in accordance with the U.S. Department of Transportation's Federal Aviation Administration (FAA) requirements of a class C cargo compartment for a commercial passenger aircraft. For example, sealing member 42 may substantially prevent hazardous quantities of smoke, flames or fire suppressant from leaving cargo compartment 12 and potentially entering passenger cabin 26 located above cargo compartment 12 during a fire or other similar event. Interface 38 may have a resistance to elevated temperatures that may accompany such events. For example, interface 38 may be configured to resist breakdown for a minimum period of time during such events.

FIG. 3 shows an axial cross-sectional view of fire suppressant conduit 18 extending in cargo compartment 12, taken along line 3-3 in FIG. 2. Fire suppressant conduit 18 may comprise delivery tube 44 and nozzle 46. Nozzle 46 may be in fluid communication with delivery tube 44. Nozzle 46 may be exposed to cargo compartment 12 for discharging fire suppressant into cargo compartment 12 when needed. Nozzle 46 is shown as being an angular nozzle (e.g., oriented at 45 degrees from the longitudinal axis of delivery tube 44) for discharging fire suppressant laterally from the longitudinal axis of delivery tube 44 but it is understood that other types of suitable nozzles 46 could be used. For example, nozzle 46 could instead or in addition be substantially straight so as to deliver fire suppressant along a nominal direction substantially coaxial with the longitudinal axis of delivery tube 44. An overall outer diameter of nozzle 46 may be larger than an overall outer diameter of delivery tube 44.

Adaptor 40 may have a generally cup-shaped body (see FIG. 4 also) and may serve as a receptacle for nozzle 46. Adaptor 40 may be configured to be installed within aperture 48 of cargo panel 28 and to be secured to cargo panel 28. For example, adaptor 40 may comprise flange 50 with one or more holes 52. Each of holes 52 may serve to receive a suitable fastener 54 for securing adaptor 40 to cargo panel 28. For example, fastener 54 may be a threaded fastener suitable for inserting into hole 52 and being threaded into cargo panel 28. A number of holes 52 and corresponding fasteners 54 may be circumferentially spaced about flange 50. Adaptor 40 may be configured to be secured to cargo panel 28 and, in some embodiments, also form a seal between adaptor 40 and cargo panel 28.

Adaptor 40 may comprise aperture 56 through which fire suppressant conduit 18 may extend so that nozzle 46 may be exposed to cargo compartment 12. For example, aperture 56 may be shaped and sized to allow passage of nozzle 46 therethrough. For example, aperture 56 may be generally circular and have a diameter that permits passage of nozzle 46 therethrough. Adaptor 40 may comprise front side 58 for exposure to (e.g., facing) cargo compartment 12 and opposite back side 60 (see FIG. 4). Back side 60 may face outwardly from cargo compartment 12 during use. While adaptor 40 is shown as having a "cup" shape and extending through aperture 48 of cargo panel 28, it is understood that adaptor 40 could have a different shape than that shown. For example, adaptor 40 could instead have a more flattened shape extending across aperture 48 of cargo panel 28 instead of a "cup" shape.

FIG. 3 also shows a cross-sectional view of sealing member 42. Sealing member 42 may comprise top plate 62 and compressible seal 64. Top plate 62 may be generally circular and may comprise central aperture 66 through which fire suppressant conduit 18 may extend. Top plate 62 may be secured to mounting platform 34 of bracket 32. For example, central aperture 66 of top plate 62 may be smaller than the overall diameter of nozzle 46. Accordingly, top plate 62 may be secured between mounting platform 34 and nozzle 46 via nut 36. The arrangement of nut 36, mounting platform 34 and top plate 62 may, in some embodiments, also form a seal between top plate 62 and fire suppressant conduit 18.

Compressible seal 64 may be substantially annular and may receive fire suppressant conduit 18 therethrough. An upper portion of compressible seal 64 may be retained by top plate 62. For example, an upper portion of compressible seal 64 may be retained in a folded-over retaining lip of top plate 62. For example, compressible seal 64 may be crimped by top plate 62. A lower portion of compressible seal 64 may be configure to be flexibly biased against adaptor 40 to form a seal therebetween. For example, compressible seal 64 may be configured to be flexibly biased against a substantially annular region of back side 60 of adaptor 40 surrounding aperture 56. Accordingly, when biased against back side 60 of adaptor 40, compressible seal 64 may form a seal surrounding aperture 56 of adaptor 40 and consequently, sealing member 42 may form a seal between fire suppressant conduit 18 and adaptor 40. Compressible seal 64 may have a substantially C-shaped cross-section when in use as shown in FIG. 3. Top plate 62 of sealing member 42 may comprise a metallic material and compressible seal 64 may comprise an at least partially resiliently compressible material that provides a flexible seal against adaptor 40.

Sealing member 42 may be sufficiently resilient so that relative movement (e.g., vibration) between cargo panel 28 and fire suppressant conduit 18 anticipated during normal use of aircraft 10 may be absorbed. For example, movement of cargo panel 28 due to some pressure differential between cargo compartment 12 and the exterior of cargo compartment 12 (e.g., passenger cabin 26) or due to other factors may be substantially absorbed by compressible seal 64 as explained above. Compressible seal 64 may be configured to provide adequate sealing ability when a predetermined biasing force is exerted between compressible seal 64 and back side 60 of adaptor 40. For example, in some embodiments, a sealing member 42 suitable for interface 38 may be sold by MEGGITT PLC.

Due at least in part of the presence of sealing member 42 providing flexibility in interface 38 between fire suppressant conduit 18 and cargo panel 28, movement of cargo panel 28 relative to fire suppressant conduit 18 (under normal operating conditions) may not induce potentially damaging stresses in fire suppressant conduit 18. Accordingly, fire suppressant conduit 18 may not be required to absorb such movements. For example, the overall length of fire suppression conduit 18 may not be determined based on the ability to absorb such movements. Fire suppressant conduit 18 may serve to deliver fire suppressant from main line 16 to a desired delivery location in cargo compartment 12. For example, delivery tube 44 of fire suppressant conduit 18 may extend substantially entirely perpendicular (e.g., vertical) to main line 16 if the desired delivery location in cargo compartment 12 is substantially in line with main line 16. For example, delivery tube 44 of fire suppressant conduit 18 may also extend substantially entirely perpendicular (e.g., vertical) to cargo panel 28. Alternatively, if the desired delivery location is at some lateral distance (e.g., laterally offset) from main line 16, a portion of fire suppressant conduit 18 could extend laterally from main line 16. In some embodiments, fire suppressant conduit 18 may extend to the desired delivery location following the shortest suitable path. Since, interface 38 may be flexible and at least partially mechanically decouple (i.e., provide a non-rigid connection between) cargo panel 28 and fire suppressant conduit 18, fire suppressant conduit 18 may not require additional length and associated shielding (i.e., weight) for the purpose of absorbing movements/vibrations that could otherwise be transferred from cargo panel 28 to fire suppressant conduit 18.

Figure 4:
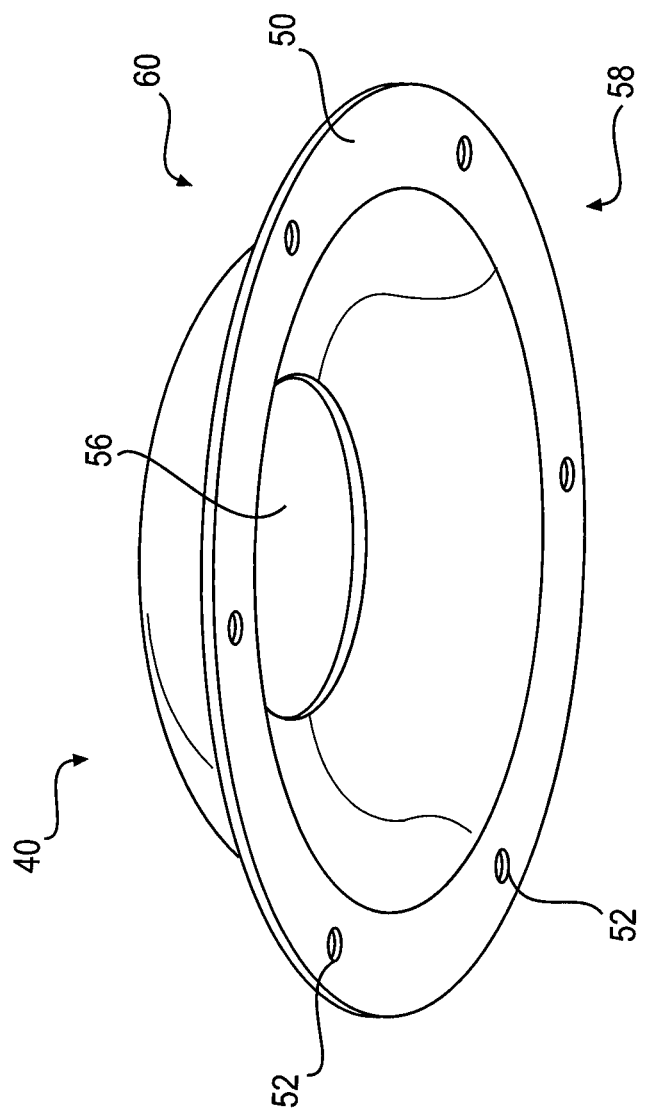
FIG. 4 shows an axonometric view of an adaptor providing the fire suppressant distribution conduit of FIG. 2 access to the cargo compartment.

FIG. 4 shows an axonometric view of adaptor 40, which may provide fire suppressant conduit 18 access to cargo compartment 12.

Figure 5:
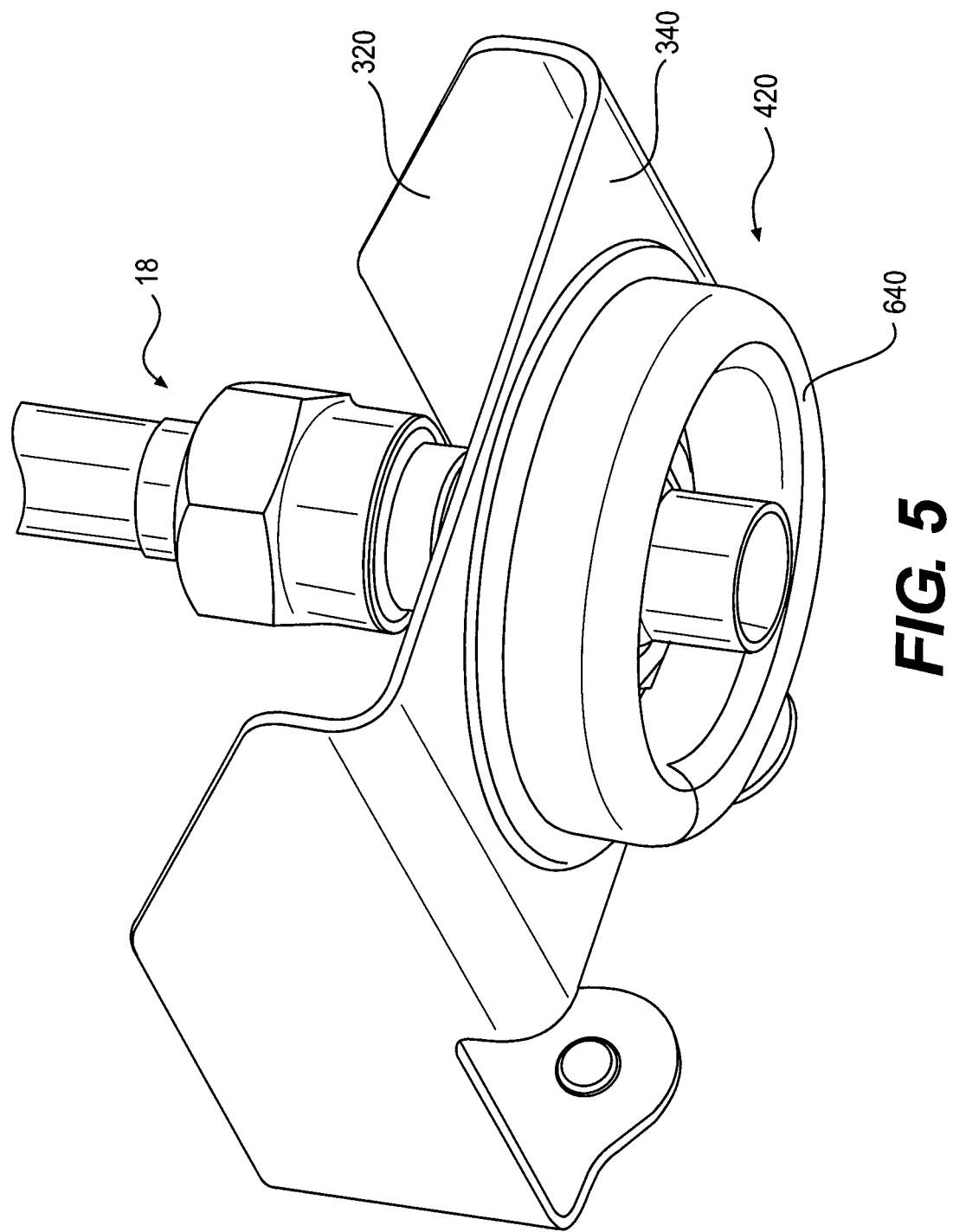
FIG. 5 shows an axonometric view of a sealing member for providing a seal between the fire suppressant distribution conduit of FIG. 2 and the adaptor of FIG. 4.

FIG. 5 shows an axonometric view of exemplary sealing member 420 and bracket 320 according to an alternate embodiment. Sealing member 420 may provide a seal between fire suppressant conduit 18 and back side 60 of adaptor 40 shown in FIGS. 3 and 4. Sealing member 420 may comprise compressible seal 640.

Figure 6:
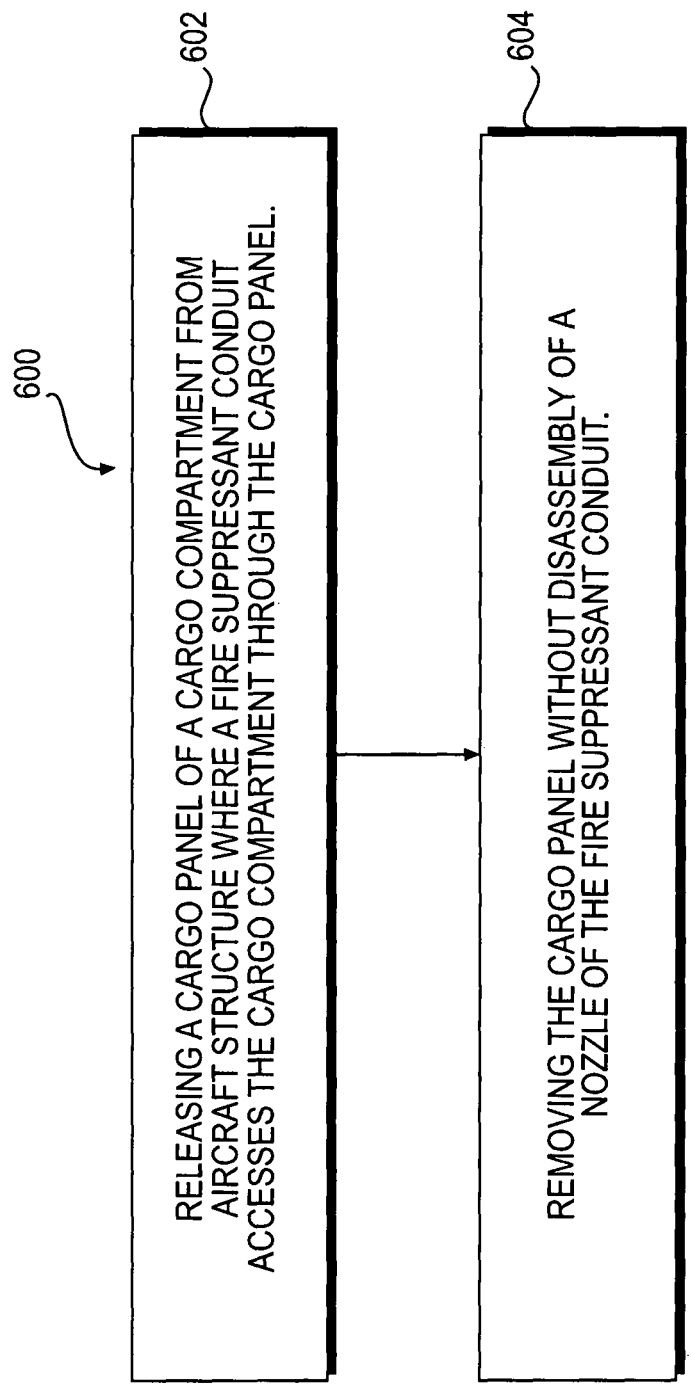
FIG. 6 shows a flowchart illustrating an exemplary method for removing a cargo panel of a cargo compartment.

FIG. 6 shows a flowchart illustrating an exemplary method 600 for removing cargo panel 28 of cargo compartment 12. As explained above, fire suppressant conduit 18 may access cargo compartment 12 through cargo panel 28 via aperture 56 sized to permit passage of nozzle 36 of fire suppressant conduit 18 therethrough. It may be desirable to remove cargo panel 28 in some instances for maintenance or other reasons. In some embodiments, the use of interface 38 may permit removal of cargo panel 28 without disassembly of nozzle 36 from fire suppressant conduit 18 and, accordingly, may simplify certain maintenance tasks. In some embodiments, the use of interface 38 may permit removal and re-installation of cargo panel 28 without disassembly of nozzle 36 from fire suppressant conduit 18.

Method 600 may comprise: releasing cargo panel 28 from aircraft structure (e.g., cross beam 30) (see block 602); and removing cargo panel 28 without disassembly of nozzle 36 of fire suppressant conduit 18 (see block 604). For example, releasing cargo panel 28 from aircraft structure may comprise the removal of one or more fasteners 31. Removing cargo panel 28 may comprise moving cargo panel 28 (or cargo panel unit that may or may not include adaptor 40) away from cross beam 30 (i.e., downwardly in FIG. 3) while allowing nozzle 36 to pass through aperture 56 and/or aperture 48.

Figure 7:
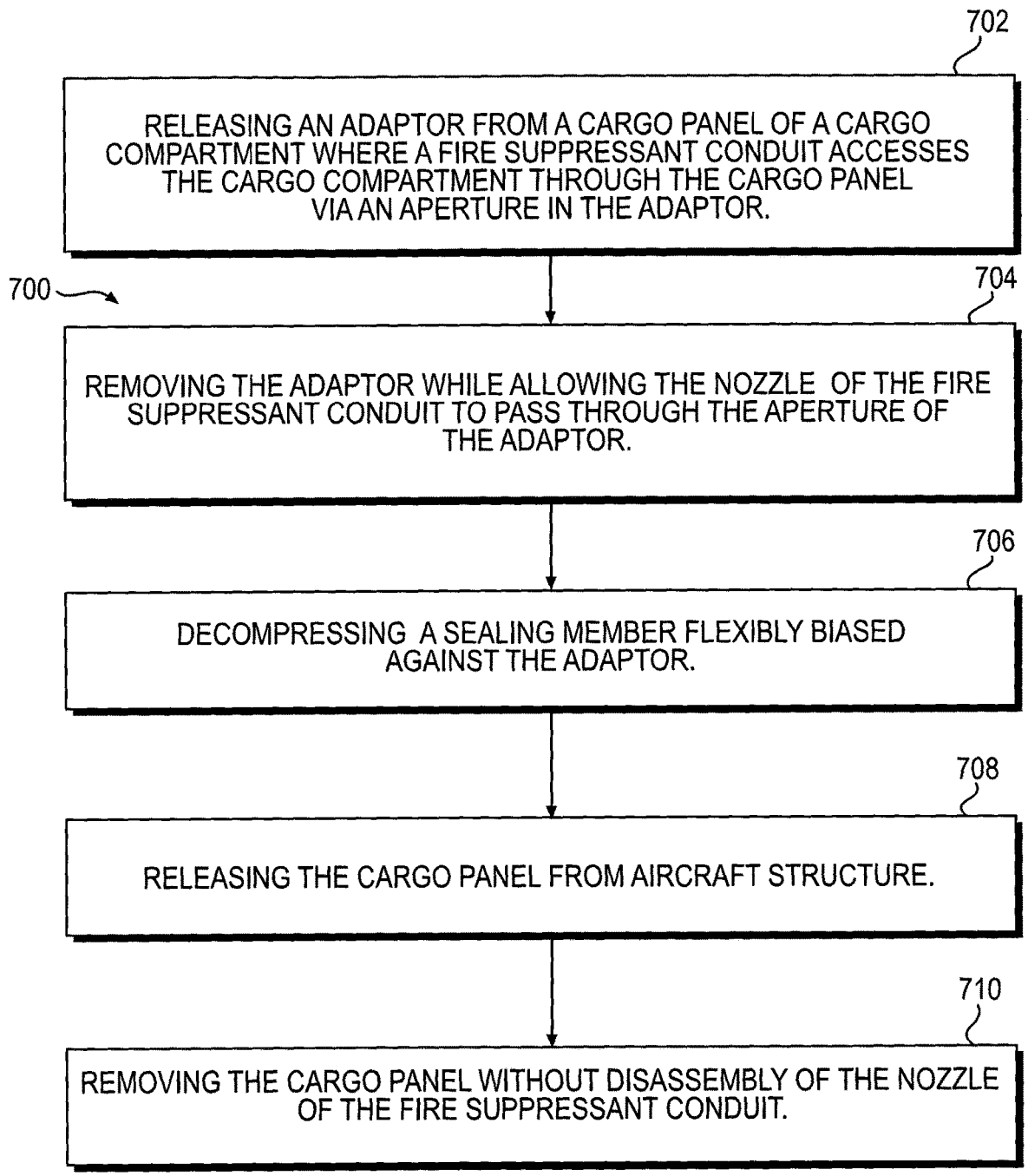
FIG. 7 shows a flowchart illustrating another exemplary method for removing a cargo panel of a cargo compartment.

FIG. 7 shows a flowchart illustrating another exemplary method 700 for removing cargo panel 28 of cargo compartment 12. As explained above, fire suppressant conduit 18 may access cargo compartment 12 through cargo panel 28 via aperture 56 formed in adaptor 40. Aperture 56 may be sized to permit passage of nozzle 36 of fire suppressant conduit 18 therethrough. It may be desirable to remove cargo panel 28 in some instances for maintenance or other reasons. Method 700 may comprise: releasing adaptor 40 from cargo panel 28 of cargo compartment 12 (see block 702); removing adaptor 40 while allowing nozzle 36 of fire suppressant conduit 18 to pass through aperture 56 of adaptor 40 (see block 704); decompressing sealing member 42 flexibly biased against adaptor 40 (see block 706); releasing cargo panel 28 from aircraft structure (e.g., cross beam 30) (see block 708); and removing cargo panel 28 without disassembly of nozzle 36 of fire suppressant conduit 18 (see block 710).

For example, releasing of adaptor 40 from cargo panel 28 may comprise the removal of one or more fasteners 54 which is/are used to removably secure adaptor 40 to cargo panel 28. Removing adaptor 40 may comprising moving adaptor 40 away from cargo panel 28 (i.e., downwardly in FIG. 3) while allowing nozzle 36 to pass through aperture 56. Decompressing of sealing member 42 may also occur when adaptor 40 is moved away from cargo panel 28 so it is possible that blocks 704 and 706 could occur substantially simultaneously. Accordingly, the seal formed by sealing member 42 being pressed against adaptor 40 may be formed and broken by: (1) biasing adaptor 40 against sealing member 42; and, (2) moving adaptor 40 away from sealing member 42, respectively. Releasing of cargo panel 28 from aircraft structure may comprise the removal of one or more fasteners 31. Removing cargo panel 28 may comprise moving cargo panel 28 away from cross beam 30 (i.e., downwardly in FIG. 3) while allowing nozzle 36 to pass through aperture 48.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. For example, while any of the elements/components disclosed may be referenced as being singular, it is understood that the embodiments disclosed herein could be modified to include a plurality of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An apparatus for providing an interface between a fire suppressant conduit and a cargo panel of a cargo compartment of an aircraft, the apparatus comprising:
    an adaptor configured to be releasably secured to the cargo panel and provide the fire suppressant conduit access to the cargo compartment through the cargo panel, the adaptor comprising an aperture for receiving the fire suppressant conduit, the aperture being sized to permit passage of a nozzle of the fire suppressant conduit therethrough;
    a platform configured to be secured to and surround the fire suppressant conduit; and
    a sealing member configured to provide a seal between the adaptor and the fire suppressant conduit, the sealing member comprising a plate and a compressible member, wherein:
        the plate is secured to the platform and is disposed between the compressible member and the platform;
        the compressible member has an annular shape having a central axis and is configured to receive the fire suppressant conduit therethrough;
        the compressible member has a first axial end along the central axis and a second axial end opposite the first axial end, the first axial end being secured to the plate, the second axial end being flexibly biased against the adaptor and surrounding the aperture in the adaptor;
        the compressible member has a C-shaped cross-section in a plane parallel to and passing through the central axis, the C-shaped cross-section being defined between the first and second axial ends of the compressible member; and
        the C-shaped cross-section of the compressible member is disposed and compressible between the adaptor and the plate along the central axis of the compressible member and is decompressible by movement of the adaptor away from the platform.

2. The apparatus as defined in claim 1, wherein the sealing member is configured to form an annular sealing interface surrounding the aperture of the adaptor.

3. The apparatus as defined in claim 1, wherein the sealing member is configured to substantially prevent hazardous quantities of smoke, flames, and fire suppressant from leaving the cargo compartment.

4. The apparatus as defined in claim 1, wherein:
    the adaptor is configured to extend across an aperture in the cargo panel;
    the adaptor comprises a front side for exposure to the cargo compartment and an opposite back side; and
    the sealing member is configured to form the seal with the back side of the adaptor.

5. The apparatus as defined in claim 1, wherein the sealing member is configured to be secured to the fire suppressant conduit.

6. The apparatus as defined in claim 1, wherein the plate is made of a metallic material.

7. The apparatus as defined in claim 1, wherein the compressible member is retained in a folded-over retaining lip of the plate.

8. The apparatus as defined in claim 1, wherein the platform is configured to be transverse to the fire suppressant conduit.

9. The apparatus as defined in claim 1, wherein the plate is configured to surround the fire suppressant conduit.

* * * * *